UNITED STATES PATENT OFFICE.

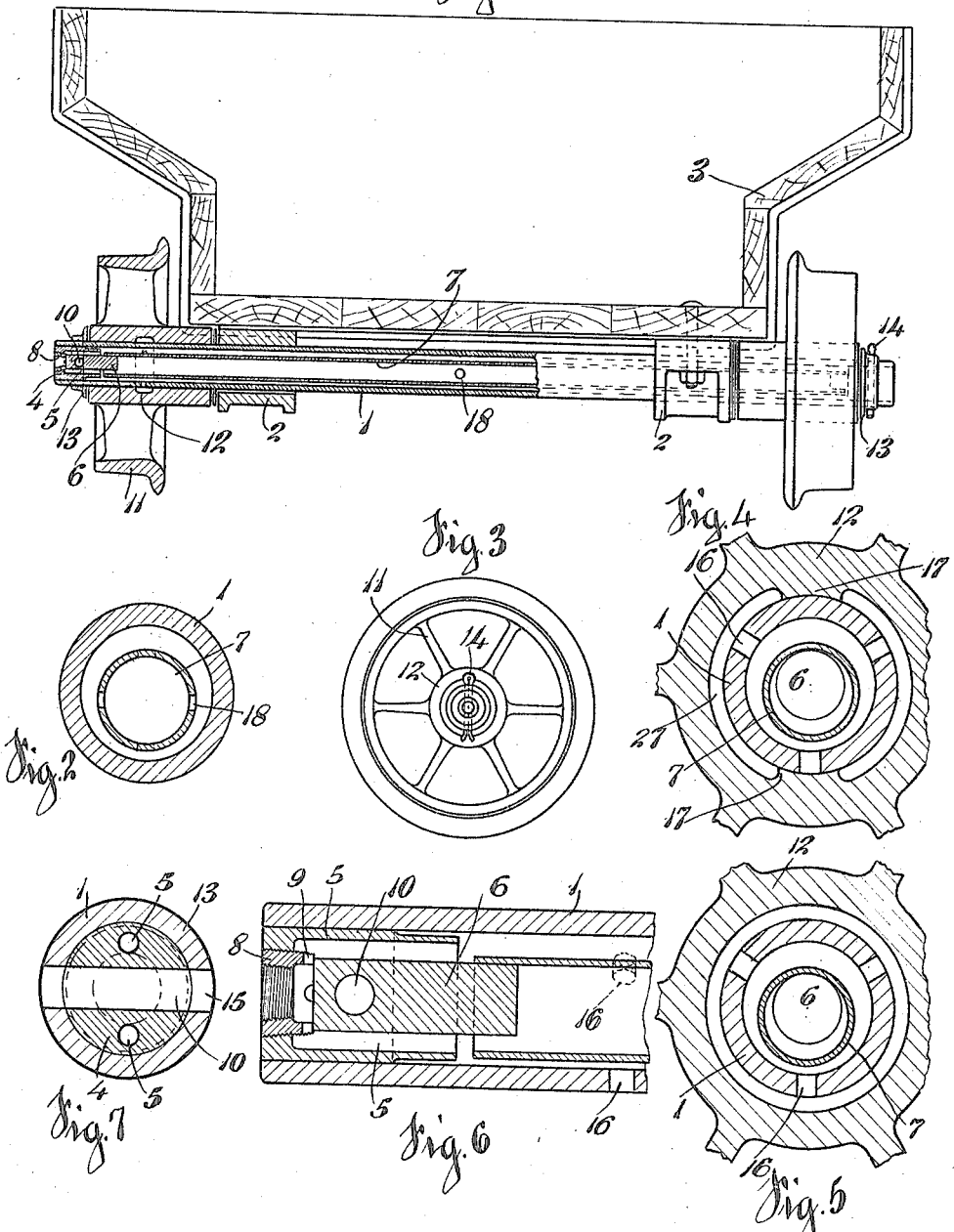
J. F. FOX.
CAR AXLE.
APPLICATION FILED SEPT. 29, 1916.
1,249,370.
Patented Dec. 11, 1917.
John F. Fox
Inventor
by Allen & Allen
Attorneys

JOHN F. FOX, OF BIRMINGHAM, ALABAMA.

CAR-AXLE.

1,249,370.  Specification of Letters Patent.  Patented Dec. 11, 1917.

Application filed September 29, 1916. Serial No. 122,796.

*To all whom it may concern:*

Be it known that I, JOHN F. FOX, a citizen of the United States, and a resident of the city of Birmingham, in the county of Jefferson and State of Alabama, have invented certain new and useful Improvements in Car-Axles, of which the following is a full, clear, and exact description, reference being had to the accompanying drawing, forming part of this specification.

My invention relates to hollow axles, particularly for mine cars, wherein the hollow axle is a grease receptacle and the grease is fed thence to the wheel hubs. The grease used must be liquid or semi-liquid in consistency and various means are provided in the art for causing it to flow to the wheel hubs.

There are various types of hollow axles for feeding grease in mine cars and the like, in some of which the grease passes out through the end of the axle, and in others of which the grease passes out through ports in the axle, either to grooves in the wheel hubs or direct to the hubs. In these various types of wheel axles, I have found, however, that the difficulty experienced is that the grease passes out too rapidly and in a very short time the wheel axles become empty. It is of very great importance, therefore, to be able to control the flow of the lubricant so that the hubs of the wheels shall be lubricated and the lubricant maintained without any surplus feed through the openings.

It is the object, therefore, of my invention to provide a retarding member which shall be placed inside of the hollow axle, independent thereof, free to move endwise and also to turn eccentrically in the hollow axle so as to keep the grease stirred up, but at the same time to retard the flow along the length of the retarding member and the hollow axle.

With such a member located in the axle for retarding and controlling the flow of the lubricant, I have obtained most satisfactory results.

The above objects I accomplish by that certain construction and arrangement of parts to be hereinafter more specifically pointed out and claimed.

In the drawing,

Figure 1 is a front elevation of a mine car truck with the axle and wheel broken away at one end, and shown in central longitudinal section.

Fig. 2 is a vertical section of the hollow axle taken at the middle point thereof.

Fig. 3 is an end elevation of the wheel and axle.

Fig. 4 is a detail section, taken through the wheel hub and hollow axle so as to cut the grooves in the wheel.

Fig. 5 is a similar view showing another type of groove.

Fig. 6 is a detail longitudinal section on a larger scale than Fig. 1.

Fig. 7 is a vertical section taken along the cotter pin hole through the axle and the end plug therefor.

The axle 1 is formed of a hollow tube and is supported in the usual block 2, 2, on a car such as the mine car 3. Driven into the ends of the axle are plugs 4, which have tubular passageways 5 therein for grease. The central portion 6 of the plugs extends into the hollow axle, and stretching across the space inside of the axle and loosely set on the ends 6 of the plugs is a pipe 7 of fairly large diameter in comparison with the hollow axle. By fairly large is meant that this pipe 7 should be more than a mere pin in comparison with the interior diameter of the axle.

It is not requisite that the pipe 7 be used, as any bar or number of bars, or other means, held inside of the hollow axle would serve the same purpose provided only that they were of sufficient area.

The pipe 7 is preferably of a size to fit very loosely on the ends 6 of the plugs so that there will be, say, half an inch of play lengthwise of the pipe, this being for the purpose of giving the pipe an endwise pumping movement by means of the side motion of the car from one side to another.

The ends of the plugs 4 are open and threaded to receive fittings 8, which said fittings close off the ends of the plugs except for several small openings 9 in the fittings.

The plugs have passages 10 therein at right angles to the passageways 5 and entirely out of communication with them. Through these passages pass the cotter pins 14, which hold the plugs in place.

On the ends of the axles are set the wheels 11 having hubs 12. Collars 13 are set over the ends of the axle and are held in place by the cotter pins 14 above mentioned, the axle being suitably apertured at 15, 15, to allow for passage of the pins. This collar is preferably adjusted so that it does not force the hub of the wheel against the block 2 and thereby allows for some endwise play to the wheel.

Around the hub of the wheel on the inside is formed a suitable chamber or chambers for the receipt of grease from the axle, and in the axle are suitable ports 16, 16, through which the grease passes. The chambers are preferably formed in the hubs of the wheels in two grooves 27 of considerable width, with the same separated by bridges 17, 17. These bridges provide for the uniform bearing of the wheel hub on the axle and prevent the uneven wearing of the axle at the grooves.

It is readily possible to use other forms of groove, however, as, for example, the type shown in Fig. 5 wherein the groove is annular in shape.

The pipe 7 has several apertures 18 in the middle portion thereof (Fig. 1) and grease will flow inside of this pipe. It will be noted that the pipe is larger than the central portions of the plugs, and that accordingly the grease can easily work out of the ends of the pipe, assisted as it will be by the endwise play thereof. The pipe will also fall about in the inside of the axle when the car is dumped, and keep the grease worked up, although except at unusual occurrences the axle does not revolve. The function of the pipe and the reason for its insertion is so that it will retard its flow, thereby controlling the amount fed to the wheels.

In operation the grease is inserted in the axle through the fittings in the end plugs thereof, by forcing it in with a suitable gun or the like. The fittings may be closed if desired. The grease will be forced by movement of the car to the inner periphery of the axles, and will thus be in a position to pass out of the ports into the grooves in the hubs. These grooves, which are always in registry with the ports, will still have some pumping action because of the endwise play of the wheels, which will spread the grease along the hubs, thereby thoroughly lubricating the hubs and the axle at the bearing point. The pipe, or whatever tubular or solid or integral member is used in its place within the axle, will keep the grease from collecting and remaining in spots along the inner periphery of the axle, and compel it to travel to the ports in uniform and restricted quantities.

The special form of inner member shown and described will be particularly effective to control the movement of the grease. It is to be understood distinctly that in hollow axles of the type shown with loose wheels, there is no centrifugal throwing out of the grease. The grease travels out of the lower port in the axle and when the axle creeps around, if such takes place, the other ports will be brought down for flow.

It will be understood that it is not desired that the claims that follow be limited to specific structure of the various elements of the device above described, because of a failure to point out the equivalent structures which could be used without departing from the spirit of the invention.

Having thus described my invention, what I claim as new and desire to secure by Letters Patent, is:—

1. In combination with a hollow axle, wheels having hubs, means for mounting the wheels on the axle so as to rotate thereon, passageways from the axle to the wheel hub, and means suspended within the hollow axle to control and retard the flowing of the grease to said passageways without stopping said passageways.

2. In combination with a hollow axle, a wheel having a hub mounted on the axle and adapted to rotate thereon, ports in the sides of the axle leading to the wheel hubs, and means suspended within the hollow axle to control and retard the flowing of the grease to said passageways without stopping said passageways.

3. In combination with a hollow axle, a wheel having a hub mounted on the axle and adapted to rotate thereon, a groove in the hub, ports in the axle communicating with the groove, and means suspended within the hollow axle to control the flowing of grease to said passageways without stopping said passageways.

4. In combination with a hollow axle, a wheel having a hub mounted on the axle and adapted to rotate thereon, grooves in the hub separated by bridges, ports in the axle communicating with the grooves and means suspended within the hollow axle to control and retard the flowing of the grease to said passageways without stopping said passageways.

5. In combination with a hollow axle, and wheels having hubs, means for mounting wheels on the axle so as to rotate thereon, passageways from the axle to the wheel hubs, and a member suspended lengthwise within the axle, and of comparatively large size compared to the interior dimension of the axle so as to retard without stopping the flow of lubricant.

6. In combination with a hollow axle, wheels having hubs, means for mounting a wheel on the axle so as to rotate thereon, passageways from the axle to the wheel hub, and means suspended within the hollow axle, but independent thereof, to control and retard flowing of the grease to said passageways without stopping the flow thereof.

7. In combination with a hollow axle, and wheels having hubs, means for mounting wheels on the axle so as to rotate thereon, passageways from the axle to the wheel hubs, and a member suspended by its ends lengthwise within the axle, and of comparatively large size compared to the interior dimension of the axle, said member comprising a piece of tubing.

8. In combination with a hollow axle, and wheels having hubs, means for mounting wheels on the axle so as to rotate thereon, passageways from the axle to the wheel hubs, and a member suspended by its ends lengthwise within the axle, and of comparatively large size compared to the interior dimension of the axle, said member comprising a piece of tubing, said piece of tubing being mounted so as to allow endwise play thereof.

9. In combination with a hollow axle, and wheels having hubs, means for mounting wheels on the axle so as to rotate thereon, passageways from the axle to the wheel hubs, and a member suspended by its ends lengthwise within the axle, and of comparatively large size compared to the interior dimension of the axle, said member being mounted loosely at the ends so as to allow for endwise play thereof.

10. In combination with a hollow axle, and wheels having hubs, means for mounting wheels on the axle so as to rotate thereon, passageways from the axle to the wheel hubs, and a member suspended by its ends lengthwise within the axle, and of comparatively large size compared to the interior dimension of the axle, said member being mounted loosely at the ends so as to allow for endwise and lateral play thereof.

11. In combination with a hollow axle, wheels having hubs, means for mounting wheels on the axle so as to rotate thereon, passageways from the axle to the wheel hubs, and a member suspended by its ends lengthwise within the axle, and of comparatively large size compared to the interior dimensions of the axle, said member comprising a piece of tubing, and said member being mounted so that its outer edge clears the inside of the axle.

JOHN F. FOX.

Copies of this patent may be obtained for five cents each, by addressing the "Commissioner of Patents, Washington, D. C."